United States Patent
Pflug et al.

(10) Patent No.: US 9,856,970 B2
(45) Date of Patent: Jan. 2, 2018

(54) BELT DRIVE FOR A MOTOR VEHICLE

(71) Applicant: Schaeffler Technologies AG & Co. KG, Herzogenaurach (DE)

(72) Inventors: Rainer Pflug, Heilsbronn (DE); Juergen Windrich, Leimen (DE); Helmut Schillinger, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 136 days.

(21) Appl. No.: 14/420,232

(22) PCT Filed: May 29, 2013

(86) PCT No.: PCT/EP2013/061027
§ 371 (c)(1),
(2) Date: Feb. 6, 2015

(87) PCT Pub. No.: WO2014/023449
PCT Pub. Date: Feb. 13, 2014

(65) Prior Publication Data
US 2015/0219203 A1    Aug. 6, 2015

(30) Foreign Application Priority Data
Aug. 7, 2012 (DE) .......... 10 2012 213 972

(51) Int. Cl.
*F16H 57/04* (2010.01)
*F16H 55/17* (2006.01)
*F16H 7/02* (2006.01)

(52) U.S. Cl.
CPC .......... *F16H 57/041* (2013.01); *F16H 7/023* (2013.01); *F16H 55/171* (2013.01)

(58) Field of Classification Search
CPC ....... F16H 7/023; F16H 55/171; F16H 57/041
See application file for complete search history.

(56) References Cited

U.S. PATENT DOCUMENTS 5,157,963 A * 10/1992 Muyskens .............. G01N 33/30
                                                              73/53.05
7,588,120 B2    9/2009 Ha et al.
(Continued)

FOREIGN PATENT DOCUMENTS

CN    101024402    8/2007
CN    101400453    4/2009
(Continued)

*Primary Examiner* — William E Dondero
*Assistant Examiner* — Robert T Reese
(74) *Attorney, Agent, or Firm* — Davidson, Davidson & Kappel, LLC

(57) ABSTRACT

A belt drive for a motor vehicle having at least two toothed pulleys (1) which are spaced apart from one another and having a toothed belt which wraps around them, wherein a positively locking connection is formed between a toothing system of the wraparound means and a toothing system (2) of the toothed pulleys (1), which positively locking connection is of low-friction configuration by an anti-friction agent which acts between the toothing systems is provided. In order for it to be possible to configure a toothed belt inexpensively and without an anti-friction agent, the anti-friction agent is formed in the form of a lubricant-varnish layer (5) which is applied at least to a toothing system (2) of a toothed pulley (1).

9 Claims, 1 Drawing Sheet

(56) References Cited

U.S. PATENT DOCUMENTS

| | | | |
|---|---|---|---|
| 2007/0082547 A1* | 4/2007 | Komoto | B29C 45/14311 439/587 |
| 2009/0311476 A1 | 12/2009 | Stetina et al. | |
| 2010/0160102 A1 | 6/2010 | Haag et al. | |
| 2010/0269617 A1 | 10/2010 | Eitzinger | |
| 2012/0037460 A1 | 2/2012 | Zaph | |
| 2014/0109709 A1* | 4/2014 | Eitzinger | F16H 55/06 74/421 R |
| 2014/0215821 A1 | 8/2014 | Tanigawa et al. | |
| 2015/0093595 A1* | 4/2015 | Asakawa | C10M 107/38 428/640 |

FOREIGN PATENT DOCUMENTS

| | | |
|---|---|---|
| CN | 101846165 | 9/2010 |
| CN | 102037242 | 4/2011 |
| DE | 199 54 808 | 5/2001 |
| DE | 102008013570 | 9/2009 |
| JP | S5368685 | 6/1978 |
| JP | S63319115 | 12/1988 |
| JP | H04365879 | 12/1992 |
| JP | H0596564 | 4/1993 |
| JP | 2004 106984 | 4/2004 |
| JP | 2004 205009 | 7/2004 |
| WO | WO 2007/082613 | 7/2007 |
| WO | WO 2009/076689 | 6/2009 |
| WO | WO 2010/084104 | 7/2010 |

* cited by examiner

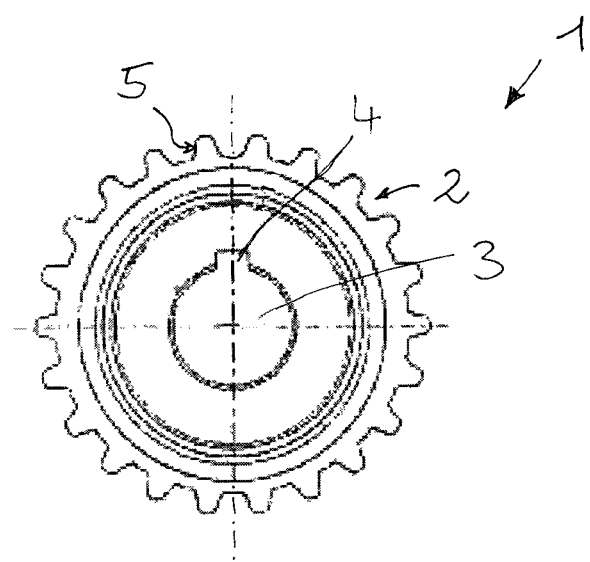

BELT DRIVE FOR A MOTOR VEHICLE

The present invention relates to a belt drive for a motor vehicle including at least two toothed pulleys which are spaced apart from one another and a toothed belt which enlaces them, a form-locked connection being formed between a toothing system of the enlacement means and a toothing system of the toothed pulleys, the form-locked connection being formed to have low friction with the aid of a lubricant acting between the toothing systems.

BACKGROUND

Belt drives according to the definition of the species are, for example, used for controlling an internal combustion engine between the crankshaft and the camshaft. Toothed pulleys having external toothing systems are accommodated on the camshaft and on the crankshaft, the external toothing systems forming a form-locked connection with a toothed belt having an internal toothing system, thus making it possible for the camshaft drive to have angular accuracy. Additional toothed pulleys may be provided, for example, for driving auxiliary components. During the continuous formation and separation of form-locked connections in the toothing systems, friction occurs on the contact surfaces between the belt and toothed pulleys, which may result in wear of the belt, in its heating and in reduced efficiency of the belt drive. To improve such frictional properties of a belt drive, it is proposed in DE 10 2008 013 570 A1 to provide the toothed belt with a textile surface. This measure increases the complexity of manufacturing the belt and consequently the costs of the belt drive.

It is furthermore known to design the belt drive in such a way that it runs in an oil bath of the internal combustion engine. For this purpose, it is necessary to use oil-resistant toothed belts, which reduce the friction; however, they must be manufactured from expensive materials.

SUMMARY OF THE INVENTION

It is an object of the present invention to form a belt drive which is improved with regard to its frictional properties without altering the toothed belt.

The present invention provides a belt drive for a motor vehicle including at least two toothed pulleys which are spaced apart from one another and a toothed belt which enlaces them continuously forms a form-locked connection between a toothing system of the enlacement means and a toothing system of the toothed pulleys during its operation, this form-locked connection being formed to have low friction with the aid of a lubricant acting between the toothing systems, which is applied to at least one, preferably all toothed pulleys participating in the belt drive, in the form of a lubricant varnish layer applied to at least one toothing system of the toothed pulleys. The application of the lubricant to the toothed pulleys makes it possible for the toothed belt to remain essentially unchanged and to be optimized with respect to its requirements, for example, tensile strength, and to be manufactured in a simple manner. This makes it possible to avoid separate lubricants, which are applied to the toothed belt and have only limited short-term strength due to the belt's elasticity. In contrast, the lubricant varnish layer applied to the toothed pulley has a long service life, making it possible to extend the replacement cycles of the toothed belt.

The lubricant varnish layer is formed from a lubricant varnish which, for example, is applied using a dip, spray or powder coating method. After the lubricant varnish is applied, it may be cured, for example, in a temperature range from 150° C. to 200° C.

In an alternative method, the lubricant varnish layer may be applied by electrophoresis in which the lubricant varnish is appropriately formed as a cationic dipping varnish. In such a cathodic dip coating method, the toothed pulleys are connected as a cathode in the dipping varnish to anodes which are preferably spatially adapted to the shapes of the toothed pulleys and a direct current of up to, for example, 300 V is applied between the cathode and anode.

The lubricant varnish or dipping varnish and thus the lubricant varnish layer applied to the toothed pulleys preferably contains a binding agent, for example, in the form of a synthetic resin component which, depending on the coating method used, has appropriate anchor groups, for example, in the case of a cathodic dip coating, it has cationic anchor groups. In the same manner, the solvent or dispersing agent for the synthetic resin, preferably water, may be matched to the coating method, for example, it may have at least partially ionically dissociated components. In this connection, an additional lubricant proportion, which is added to the synthetic resin component and is embedded in the synthetic resin component in the cured state of the lubricant varnish layer, produces the friction-reducing effect of the lubricant varnish layer. For this purpose, the lubricant proportion may be physically or chemically bound.

The lubricant proportion may, for example, contain particles of polytetrafluoroethylene (PTFE) present in powder form or dispersed.

Alternatively or additionally, the lubricant proportion may contain particles of boron nitride. The composition of the lubricant varnish or dipping varnish may accordingly be formed as a dispersion in which the binding agent component and the lubricant proportion are set in appropriate proportions to a common solids proportion, for example, of 20 to 50 percent by weight. In this connection the lubricant proportion may amount to between 0.5 and 5 percent by weight. The lubricant varnish layer has a corrosion-inhibiting effect, for example, against hand moisture during the assembly of the belt drive and attachment of the toothed pulleys to the appropriate shafts. Should additional corrosion measures be required, an appropriate corrosion protection may be added to the lubricant varnish or dipping varnish.

It has proven to be particularly advantageous if the particles of the lubricant proportion are formed as nanoparticles, since they may, for example, be deposited in a particularly advantageous manner in lattice interstices of the synthetic resin proportion of the lubricant varnish layer. This makes it possible to improve the long-term stability of the lubricant varnish layer.

The application of a lubricant varnish layer has proven to be particularly advantageous in toothed pulleys manufactured from sinter material. The coating may be limited to the external toothing system having the points of contact with the toothed belt. However, it has proven to be advantageous if the lubricant varnish layer is, for example, applied to the entire surface of the toothed pulleys for improving the corrosion protection. To omit a dimensionally accurate cored hole for accommodating a toothed pulley on a shaft from the lubricant varnish layer, it may be masked before the coating. Alternatively, the cored hole may be used as a receptacle while the coating is carried out, so that it is compulsorily omitted.

BRIEF DESCRIPTION OF THE DRAWING

The present invention will be explained in greater detail below with reference to the sole drawing. The drawing shows a view of a toothed pulley for a belt drive.

DETAILED DESCRIPTION

The sole drawing shows sintered toothed pulley 1 including toothing system 2 formed as an external toothing system. Toothing system 2 forms a form-locked connection with a complementary toothing system of an endless toothed belt of a belt drive. Depending on the diameter, the toothed pulley is connected to a shaft such as a crankshaft or camshaft of an internal combustion engine with the aid of cored hole 3. Groove 4 forming a splined coupling with the shaft forms a non-rotatable accommodation on the shaft, so that a crankshaft angle is transferred to the camshaft with the aid of the toothed belt while forming the necessary gear ratio. Toothed pulley 1 is provided with lubricant varnish layer 5 for reducing the friction between points of contact of toothing system 2 and the toothing system of the toothed belt. In a like manner, other toothed pulleys, for example, of a tensioner pulley, an auxiliary component and the like, which, for example, are not required to have a groove, may be coated using lubricant varnish layer 5.

LIST OF REFERENCE NUMERALS

1 toothed pulley
2 toothing system
3 cored hole
4 groove
5 lubricant varnish layer

What is claimed is:

1. A belt drive for a motor vehicle comprising:
at least two toothed pulleys spaced apart from one another and a toothed belt enlacing the at least two toothed pulleys, a form-locked connection being formed between a teeth of the belt and further teeth of the toothed pulleys, the form-locked connection being formed with reduced friction with the aid of a lubricant acting between the teeth and the further teeth, the lubricant being applied in the form of a lubricant varnish layer to at least one tooth of one of the toothed pulleys, wherein the lubricant varnish layer is formed from a binding agent proportion and a lubricant proportion, the binding agent proportion is composed of at least one synthetic resin and the lubricant proportion is composed of lubricant nanoparticles, wherein the lubricant nanoparticles are physically embedded in the at least one synthetic resin.

2. The belt drive as recited in claim 1 wherein the lubricant proportion amounts between 0.5 and 5 percent by weight of the lubricant varnish layer.

3. The belt drive as recited in claim 2 wherein the lubricant proportion contains lubricant nanoparticles of polytetrafluoroethylene.

4. The belt drive as recited in claim 2 wherein the lubricant proportion contains particles of boron nitride.

5. The belt drive as recited in claim 1 wherein the lubricant varnish layer is applied with the aid of a dip, spray or powder coating method.

6. The belt drive as recited in claim 1 wherein the lubricant varnish layer is applied with the aid of a cathodic dip coating method.

7. The belt drive as recited in claim 1 wherein the lubricant varnish layer is simultaneously formed as corrosion protection, wherein the lubricant varnish layer is applied to the entire surface of the one of the toothed pulleys.

8. The belt drive as recited in claim 1 wherein the one toothed pulley is produced by sintering.

9. The belt drive as recited in claim 1 wherein the one toothed pulley is completely coated with the lubricant varnish layer except for a cored hole used as a receptacle during a coating process or closed during the coating process.

* * * * *